United States Patent [19]

Palm

[11] 4,426,369

[45] Jan. 17, 1984

[54] LOW TEMPERATURE CLAUS PROCESS WITH WATER REMOVAL

[75] Inventor: John W. Palm, Tulsa, Okla.

[73] Assignee: Standard Oil Company (Indiana), Chicago, Ill.

[21] Appl. No.: 343,662

[22] Filed: Jan. 28, 1982

Related U.S. Application Data

[63] Continuation-in-part of Ser. No. 239,772, Mar. 2, 1981, abandoned.

[51] Int. Cl.³ ............................ C01B 17/04; B01J 8/04
[52] U.S. Cl. ................................ 423/574 R; 423/576;
422/172; 422/177; 422/190
[58] Field of Search .............. 423/570, 574, 576, 539;
422/115, 117, 172, 177, 189, 190

[56] References Cited

U.S. PATENT DOCUMENTS

| | | | |
|---|---|---|---|
| 2,785,056 | 3/1957 | Thumm et al. | 423/574 R |
| 2,889,207 | 6/1959 | Eliot | 423/574 |
| 3,702,884 | 11/1972 | Hunt, Jr. et al. | 423/222 |
| 3,749,762 | 7/1973 | Montgomery | 423/574 G |
| 3,752,877 | 8/1973 | Beavon | 423/244 |
| 3,798,316 | 3/1974 | Beavon | 423/574 R |
| 3,873,679 | 3/1975 | Berry et al. | 423/574 |
| 3,895,101 | 7/1975 | Tsuruta | 423/539 X |
| 4,012,486 | 3/1977 | Singleton | 423/539 X |
| 4,035,474 | 7/1977 | Kunkel et al. | 423/576 |
| 4,097,585 | 6/1978 | Fischer | 423/574 R |
| 4,113,849 | 9/1978 | Atwood | 423/574 |
| 4,113,849 | 9/1978 | Atwood | 423/574 R |
| 4,123,505 | 10/1978 | Williamson | 423/564 |
| 4,155,990 | 5/1979 | Kimura et al. | 423/574 |
| 4,243,647 | 1/1981 | Hass et al. | 423/573 G |
| 4,280,990 | 7/1981 | Jagodzinski et al. | 423/574 R |
| 4,315,904 | 2/1982 | Lell et al. | 423/574 R |

FOREIGN PATENT DOCUMENTS

| | | | |
|---|---|---|---|
| 918384 | 1/1973 | Canada | 423/574 |
| 689664 | 4/1953 | United Kingdom | 423/576 |
| 717483 | 10/1954 | United Kingdom | 423/574 |

OTHER PUBLICATIONS

Struck, R. T. et al; "Eviron. Sci & Tech."; Jul. 1971; pp. 626–630.
Beavon et al, Oil and Gas Journal, Mar. 1979, pp. 76–80.
Beavon et al, "Developments in Selector Technology", Preprint for 7th Canadian Symposium on Catalysts, 1980, 14 pp.
Pearson, "Catalyst Performance in Low-Temperature Claus Process", Energy Processing/Canada, Jul.–Aug. 1976, pp. 38–48.
Kohl et al, "Gas Purification", 3rd Ed. 1979, pp. 679–683.

*Primary Examiner*—Earl C. Thomas

[57] ABSTRACT

Claus process sulfur recovery can be improved by performing a Claus conversion under low temperature and low water concentration conditions. The process treats a feed stream containing sulfur compounds by converting all sulfur compounds in the stream to a single sulfur species, reducing water content to low water concentrations, creation of a Claus reaction mixture, and then low temperature catalytic conversion to sulfur and water.

4 Claims, 7 Drawing Figures

LOW TEMPERATURE CLAUS PROCESS WITH WATER REMOVAL

This application is a continuation in part of application Ser. No. 239,772, filed Mar. 2, 1981, and now abandoned.

BACKGROUND OF THE INVENTION

1. Field of the Invention

The invention relates generally to a sulfur recovery process and more particularly to an improved Claus plant tail gas cleanup process.

2. Setting of the Invention

The conventional catalytic Claus reaction, $$2H_2S + SO_2 \rightleftharpoons 3S + 2H_2O,$$

for sulfur recovery from sulfur-containing gas streams is widely practiced and accounts for approximately one-half of total sulfur production. However, the effluent tail gas from the final of a series of reactors in a Claus plant contains varying quantities of different compounds, including sulfur, water, sulfur vapor, sulfur dioxide, hydrogen sulfide, carbonyl sulfide and carbon disulfide. Normally, this effluent tail gas stream is burned with air to convert all sulfur compounds present in the stream to sulfur dioxide before discharge into the atmosphere.

Ever stricter environmental standards on $SO_2$ emissions require reduction, however, in the total quantity of sulfur compounds present in a Claus unit tail gas. As the Claus reaction is equilibrium controlled, it is difficult to further improve by additional Claus conversion the percent conversion to sulfur to meet these stricter standards. Thus, efforts have been directed to methods of treating Claus tail gases to remove sulfur compounds other than additional Claus conversion. One example is U.S. Pat. No. 3,798,316 entitled "Purification of Claus Plant Tail Gas by Water Washing" issued to D. K. Beavon on Mar. 19, 1974. In this method, the Claus tail gas is treated with an aqueous absorbent solution to reduce sulfur compounds in the tail gas to acceptable levels. A similar process is described in U.S. Pat. No. 3,752,877 issued to D. K. Beavon on Aug. 14, 1973, wherein a Claus tail gas is reduced to convert all sulfur compounds to $H_2S$, the $H_2S$-rich stream is water quenched to condense water, and the $H_2S$ is then extracted by an absorbent solution such as the alkaline solution used in the Stretford process. Another extraction process is disclosed in U.S. Pat. No. 4,113,849 issued to G. R. Atwood on Sept. 12, 1978, entitled "Recovering Sulfur from Gas Streams Containing Hydrogen Sulfide". This method converts all sulfur compounds in a Claus tail gas to sulfur dioxide before cooling and contacting with an $SO_2$-absorbing solution. While sulfur recovery from Claus tail gas by methods other than additional Claus conversion is quite high, on the order of 99.9% recovery in combination with the Claus reactors, these methods suffer from operating problems such as high chemical makeup costs, chemical waste disposal, and either increased plant emissions or the necessity for plant shutdown when a process upset occurs.

Other processes have attempted to promote Claus conversion by operation of a Claus catalytic reactor at lower temperatures. An example, known as the Cold Bed Adsorption Process, is described in U.S. Pat. No. 3,702,884, entitled "Method for Reducing Sulfur Compounds in Sulfur Plant Effluent" issued to E. B. Hunt, Jr. et al., on Nov. 14, 1972. This method removes up to 99% of the sulfur compounds present in the original acid gas by catalytic conversion of $H_2S$ and $SO_2$ in the tail gas to sulfur which is adsorbed on the catalyst bed at a temperature of 250 to about 350° F. A further variation of the Cold Bed Adsorption Process is U.S. Pat. No. 3,749,762, issued to N. R. Montgomery on July 31, 1973, and entitled "Process for Producing Sulfur from Sour Gas". U.S. Pat. No. 2,785,056, entitled "Process for the Production of Sulfur from Hydrogen Sulfide and Sulfur Dioxide or Oxygen-Containing Gas", issued to W. Thumm, et al., on Mar. 12, 1957, illustrates a similar process for using a series of Claus reactors operating above and below the sulfur dew point. However, both of these processes, while yielding sulfur recovery of up to 99%, suffer in that they may fail to meet more stringent environmental protection standards or to provide recoveries in excess of 99%.

An additional Claus process variation is disclosed in British Pat. No. 717,483, issued to W. M. Catchpole, et al., on Oct. 27, 1954, entitled "Process for Recovery of Sulfur from Hydrogen Sulfide". This process discloses operation of two reactors, the first operating at a temperature of 300° C. and the second of which is operated at a temperature of 100°–150° C., preferably 150° C., to deposit sulfur on the catalyst.

"BSR/Selectox I Sulfur Recovery Process for Claus Tail Gas Treating", by D. K. Beavon and R. H. Hass, presented at the Fifth Canadian Symposium on Catalysis, Oct. 26–27, 1977, discloses a process for removal of sulfur from a Claus tail gas by the direct oxidation process. In this process, a Claus tail gas stream is hydrogenated, then cooled and water quenched to remove water. The resulting stream is combined with a stoichiometric amount of air and fed to a reactor at a temperature of about 325° F. for oxidation of the $H_2S$ present in the tail gas stream to sulfur over a proprietary Selectox-32 catalyst. The process achieves overall recoveries of up to 98%.

It is becoming increasingly evident, however, that the permissible sulfur emission levels will mandate sulfur recoveries on the order of 99.9% and, in any event, methods of achieving recoveries in excess of 99% are highly desirable. Thus, a method for achieving high sulfur removal without the problems of the known absorbent solutions is required.

SUMMARY OF THE INVENTION

The method of the invention comprises an improved sulfur recovery process wherein sulfur is recovered from a sulfur-containing gaseous stream comprising water and sulfur-containing compounds by lowering water content of the gaseous stream, manipulating the gaseous stream to create Claus reaction mixture, and then catalytically converting the reaction mixture to produce sulfur at a temperature where the sulfur adsorbs on the catalyst. The instant invention, in a further aspect, comprises a sulfur recovery process wherein a gaseous stream, comprising water, and a mixture of sulfur-containing compounds is treated according to a Claus process to recover element sulfur therefrom. The gaseous stream is subjected to conditions which convert essentially all sulfur compounds in the stream to a single sulfur-containing species. Water content in the resulting stream is reduced and the dried stream is then manipulated to create a 2:1 molar ration of $H_2S/SO_2$ or a Claus catalytic conversion. This conversion is performed at a temperature such that product sulfur adsorbs on the catalyst. Use of this method can allow overall sulfur conversions on the order of 99.7% or higher. According to a further aspect of the invention, the single sulfur species referred to is sulfur dioxide.

DETAILED DESCRIPTION OF THE INVENTION

The instant invention comprises a process for recovery of sulfur from a sulfur-containing gas stream, for example effluent from a Claus plant, wherein sulfur components present in the stream are catalytically converted by a Claus process to sulfur and water. Normally, Claus plant effluent contains approximately 30% water, varying amounts of $H_2S$ and $SO_2$, $N_2$, $CO_2$, sulfur vapor, and other sulfur compounds such as COS and $CS_2$. Conventional Claus treatment of the effluent is not feasible. This is so because lower temperatures are required to achieve further Claus conversion, but to cool the effluent gas to temperatures below 260° F. requires contacting the effluent with a condenser whose temperature is lower than 260 deg. F. As the freezing point of sulfur is about 240° F., a condenser temperature below about 247° F. will cause deposition of sulfur on the condenser surfaces leading to plugging problems. Moreover, at lower condenser temperatures, below about 200° F., liquid water condenses. The condensed water can then dissolve $H_2S$ and $SO_2$ and catalyzes the reaction of these compounds to form colloidal sulfur and other undesirable byproducts. Thus, the lowest practical temperature a Claus reaction feed gas stream can currently be cooled to is about 260° F.

The process of the instant invention performs a Claus conversion of $H_2S$ and $SO_2$ present in a gas stream to sulfur and water under low water vapor and low temperature conditions. The purpose of the low water vapor condition, less than about 15% by volume but preferably less than about 10% or even about 5% by volume, is to force the forward Claus reaction towards completion while avoiding the reverse Claus reaction which occurs when water and sulfur are present in significant amounts. The water content in the sulfur-containing gas stream should be reduced to less than about 15% as it is believed that higher water concentrations will not eliminate the problems which can be caused by the presence of water at low temperatures, for example, at 260° F. or lower.

Lower temperatures are utilized to improve equilibrium conditions towards sulfur formation by the exothermic Claus reaction. The low temperatures spoken of refer to temperature of a feed stream to a low temperature Claus catalytic reactor and are those temperatures where product sulfur will adsorb on a Claus catalyst. Sulfur produced by the Claus reaction will adsorb on a Claus catalyst at temperatures below the sulfur dewpoint, as practiced in the Hunt et al. patent described above. It is preferable, however, that the catalytic conversion of the invention be performed at temperatures below 260° F., or the percent conversion to sulfur may not be sufficiently higher than the conversion yielded by existing Claus processes to justify the expense of water removal.

The catalytic conversion can also be performed at lower temperatures than 260° F. However, at a temperature below about 220° F., water also adsorbs on the catalyst. This tends to decrease catalyst activity and may affect the kinetics of the conversion also. The minimum practical inlet temperature to the low temperature reactor depends on the amount of water and $H_2S$ in the feed gas. This minimum temperature is reached when water adsorption on the catalyst interferes appreciably with the Claus conversion, and depends on the water dew point of the exit gas. It is believed that about 160° F. may be the lowest commercially practical temperature for a typical operation.

Another aspect of lower temperature conversions is that loss in percent recovery is due both to sulfur vapor loss and to unconverted $H_2S$ and $SO_2$. The sulfur vapor pressure and therefore sulfur vapor loss is calculated to double approximately every 20° F. increase in temperature. At about 10% water concentrations, an inlet temperature of 240° F. yields slightly lower percent unconverted $H_2S$ and $SO_2$ in the exit gas than an inlet temperature of 220° F., but the sulfur vapor losses are higher. Thus, it is believed that about 220° F. may be the optimum inlet temperature to the low temperature Claus reactor at 10% percent water conditions based upon percent unconverted sulfur compounds and sulfur vapor loss in the effluent gas. But it is also believed that still lower temperatures will have maximum recovery at even lower water concentrations. For example, theoretical overall sulfur recovery (Claus unit recovery and recovery from the low temperature reactor) is calculated to be 99.95% at 5% water and 160° F. inlet temperature of the final reactor.

In reducing water content of a sulfur-containing gaseous stream comprising water and a mixture of sulfur compounds, direct cooling of the stream by water quenching is subject to difficulties. Hydrogen sulfide and sulfur dioxide present can react to form emulsified sulfur which is very difficult to separate. Thus, although reducing the water vapor to a lower level can provide a significant improvement in Claus conversion, it is also highly desirable and constitutes an aspect of the invention to convert substantially all sulfur compounds present to a single sulfur species.

As the process performs a Claus conversion under low temperature and low water conditions, to obtain highest conversion it is necessary to create a Claus stoichiometric reaction mixture of a 2/1 molar ratio of $H_2S$ to $SO_2$ in the gas stream to the low temperature reactor. The accompanying drawings illustrate methods according to the invention to cool and reduce the water content of a feed stream, and to create the desired reaction mixture stream.

To produce the reaction mixture having the proper temperature and water content, the gaseous stream containing a mixture of sulfur containing compounds may be treated to convert all sulfur species to hydrogen sulfide. This is accomplished in a hydrogenation reactor which is preferred because the hydrogenation reactor is effective for converting elemental sulfur present in, for example, the Claus plant tail gas stream, to hydrogen sulfide before cooling and reduction of water content. Extensive cooling or reduction of water content prior to hydrogenation is not currently preferred for reasons of energy efficiency and because, as discussed above, as water is condensed and/or removed the water can combine or react with elemental sulfur and other sulfur compounds present to produce a highly corrosive mixture.

Accordingly, after hydrogenation of, for example, the Claus plant tail gas stream to convert all sulfur compounds to hydrogen sulfide, the hydrogen sulfide containing stream is cooled and the water content reduced. The cooled hydrogen sulfide stream of reduced water content is then combined with a stream containing as a sulfur species, substantially only sulfur dioxide to produce a gaseous reaction mixture having a 2/1 molar ratio of $H_2/SO_2$. The temperature of at least one of the sulfur dioxide containing stream and the hydrogen sulfide containing stream is temperature adjusted so that the reaction mixture of the resulting combined stream is at or near the reaction temperature for a low temperature Claus catalytic conversion. Other methods of combining the hydrogen sulfide containing stream of reduced water content and the sulfur dioxide containing stream and producing a gaseous reaction mixture are possible. The above-described method is preferred, however, because adjusting the temperature of at least one of the separate streams before combining avoids or minimizes problems due to sulfur formation, deposition, or plugging which may result if the streams are combined prior to temperature adjustment of the gaseous reaction mixture, and can provide better energy balance for the overall process.

The sulfur dioxide stream is produced by oxidizing about a ⅓ portion of the $H_2S$ stream under conditions such that no substantial Claus reaction occurs in the oxidation and that formation of $SO_3$ is minimized, preferably by diverting about a ⅓ portion of the hydrogen sulfide stream of reduced water content and oxidizing all sulfur compounds in the ⅓ portion to sulfur dioxide. Other methods of producing the sulfur dioxide stream are of course possible, such as, for example, oxidizing a portion of, for example, the Claus plant tail gas stream or elemental sulfur; however, such other methods can significantly increase the sulfur loading in the low temperature Claus reactors.

The process is applicable to other sulfur-containing gas streams besides Claus plant effluent. However, it will usually be economically favorable to use conventional Claus techniques such as, for example, a two or three reactor Claus plant before employing the process of the invention. The process thus has great utility as a tail gas clean-up method.

Figure 1:
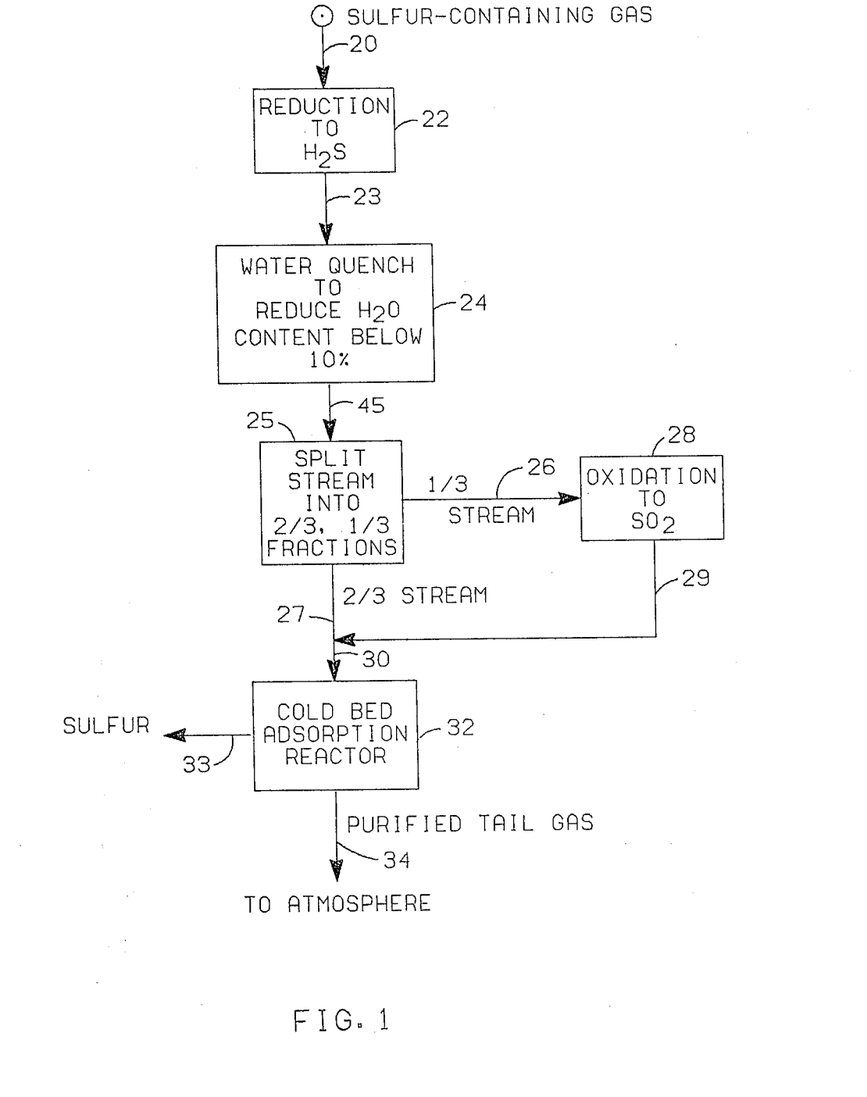
FIG. 1 illustrates a process flow sheet wherein conversion of sulfur compounds in a sulfur-containing gas stream to hydrogen sulfide is followed by reducing water content and subsequent oxidation of one-third of the hydrogen sulfide to reestablish the desired Claus stoichiometry.

Referring now to FIG. 1 wherein a process flow sheet is illustrated, sulfur-containing gas stream 20 is shown subjected first to a catalytic reducing step 22. During this reduction, substantially all sulfur compounds present in the tail gas are converted to hydrogen sulfide. By first converting all sulfur components to a single sulfur species, it is possible to cool the gas stream without sulfur condensation problems as further discussed herein. Cooling of the $H_2S$-laden stream can be performed simultaneously with or prior to the water removal step 24. Resulting $H_2S$-laden stream 23 is water quenched in water removal step 24 to reduce water content of the stream, preferably, to below 10% by volume. Resulting dried $H_2S$ containing stream 45 is split 25 into two-thirds and one-third fractions. One-third fraction 26 is sent to a catalytic oxidation step 28 wherein the $H_2S$ present in the one-third portion is oxidized to sulfur dioxide. Resulting sulfur dioxide-rich stream 29 is recombined with untreated two-thirds fraction 27. Temperature adjustment is performed to achieve the desired inlet temperature for reactor 32. The temperature adjustment preferably, although other methods are available, is performed by manipulating the temperatures of separate streams 27 and 29. It is also possible to reduce water content of stream 29 before it is recombined with stream 27. Recombined stream 30 at desired inlet temperature is sent to a Claus catalytic adsorption reactor 32 operating at a low temperature. Such a reactor is also known as a cold bed adsorption reactor. Product sulfur 33 is removed from the catalyst in a subsequent catalyst regeneration step and purified tail gas 34 is discharged to the atmosphere after burning to convert all remaining sulfur species to sulfur dioxide.

Figure 2:
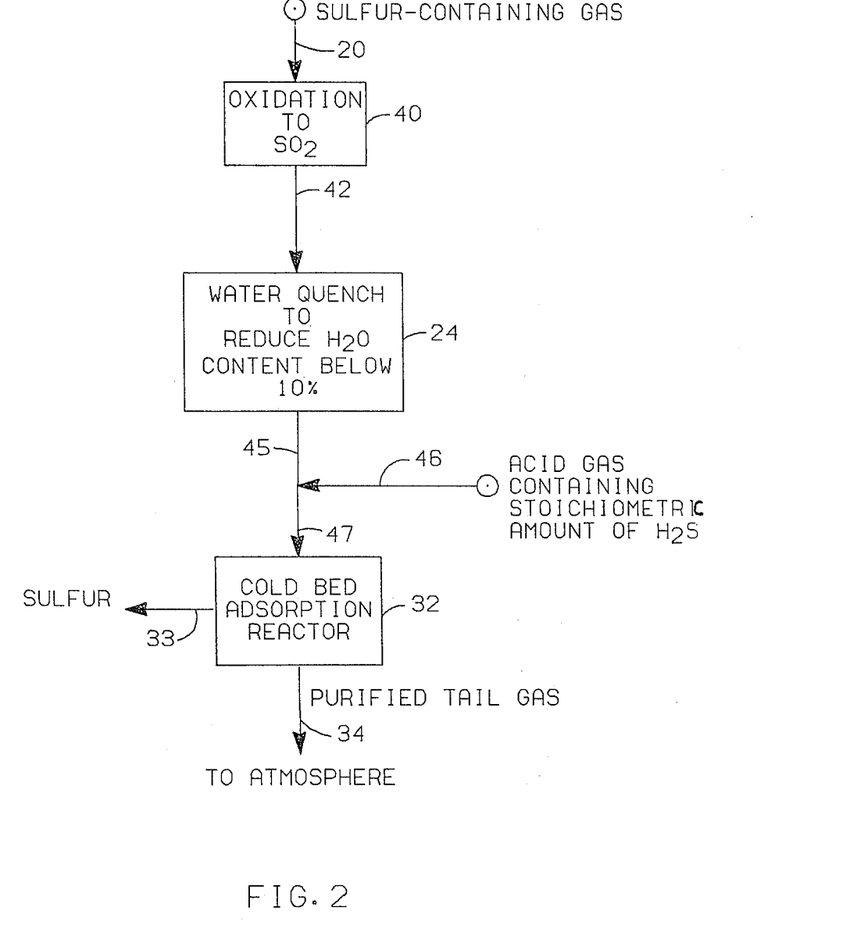
FIG. 2 illustrates another flow sheet wherein conversion of the sulfur compounds in a gas stream to sulfur dioxide is followed by reducing water content before addition of a stoichiometric amount of hydrogen sulfide and catalytic conversion to sulfur and water.

FIG. 2 illustrates a process flow sheet wherein all sulfur compounds in a gas stream are converted to $SO_2$ before conversion to sulfur. Gas stream 20 is subjected to a catalytic oxidation step 40 wherein substantially all sulfur compounds present are converted to a single sulfur-containing species, $SO_2$. The $SO_2$-rich stream 42 is cooled and then sent to a water quench zone 24 where water vapor concentration in stream 42 is reduced to below 10%. As in the process of FIG. 1, the cooling and water removal can be carried out either sequentially or simultaneously. Resulting dried $SO_2$-laden stream 45 is combined with a stoichiometric amount of hydrogen sulfide present in an acid gas 46. The acid gas, for example, can be from the original feed stream to the sulfur recovery unit. If desired, water content in stream 46 can be reduced before it is combined with stream 45. Temperature adjustment of the stream to the low temperature reactor 32 can be carried out similarly to that described above. The desired inlet temperature can be achieved by manipulating temperature of streams 45 and 46 or, for example, by adjusting temperature of stream 47. Combined stream 47 is sent to a low temperature Claus catalytic reactor 32 operating at a low temperature. Product sulfur 33 is removed from the catalyst and tail gas 34 is treated and discharged to the atmosphere.

Figure 3:
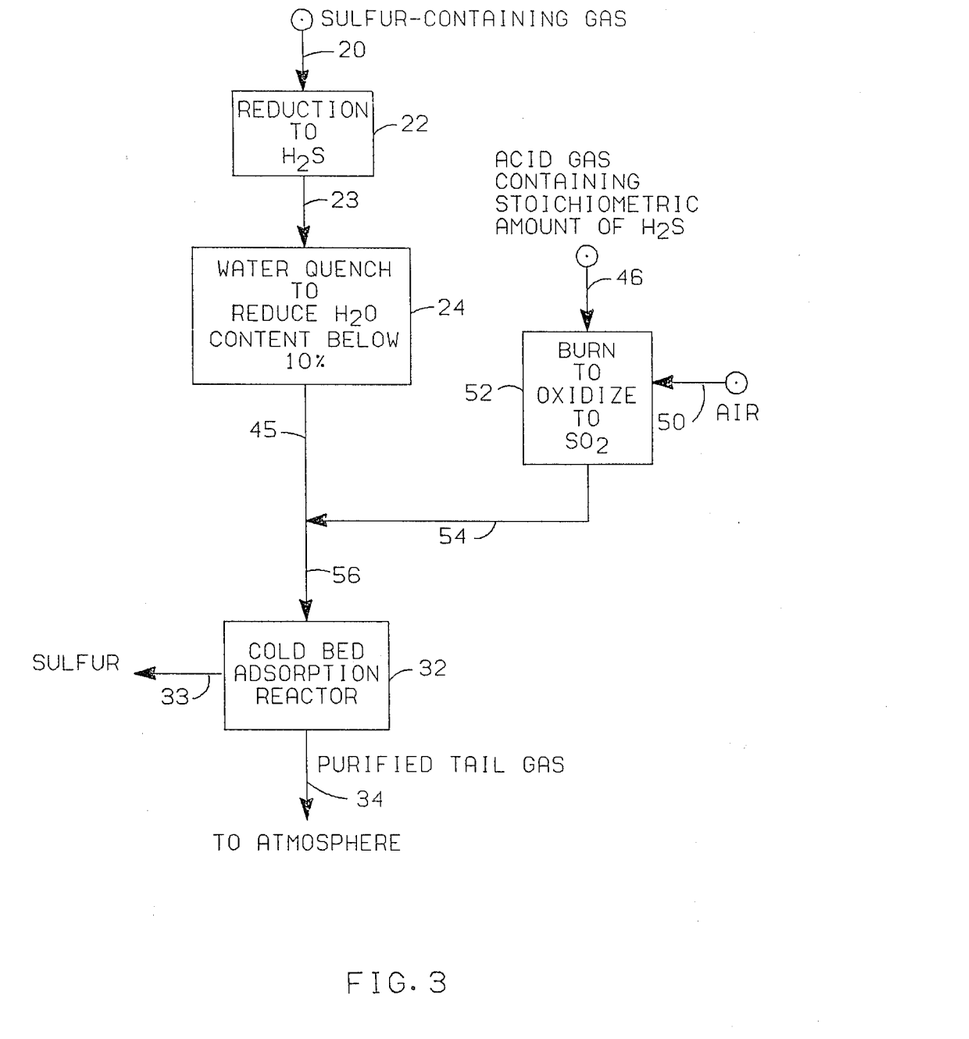
FIG. 3 illustrates a process flow sheet similar to FIG. 1 wherein sulfur dioxide to create the desired Claus reaction mixture is supplied from a separate oxidation of an acid gas stream.

FIG. 3 shows another embodiment that is similar to the one depicted in FIG. 1. It shows sulfur-containing gas stream 20 subjected to a reducing step 22. Resulting $H_2S$-laden stream 23 is cooled and subjected to water removal 24. Again, the cooling and water removal can be sequentially or simultaneously performed. Resulting dried $H_2S$-laden stream 45 is combined with $SO_2$-containing stream 54. The $SO_2$-containing stream 54 is produced by taking an acid gas 46 containing a stoichiometric amount of hydrogen sulfide and burning the acid gas with sufficient air 50 in oxidation step 52 to oxidize the H$_2$S present to SO$_2$. The acid gas 46 can be from any source with sufficient H$_2$S to furnish a stoichiometric amount of SO$_2$, and preferably will also contain a low water concentration. Alternately, the stoichiometric amount of SO$_2$ to be combined with the H$_2$S stream is derived by burning liquid sulfur with an oxygen-containing gas. The liquid sulfur can be that produced from any sulfur source. SO$_2$ from oxidized liquid sulfur will contain slightly lower water content than an SO$_2$ stream derived from oxidizing an H$_2$S stream. If desired, the oxygen-containing gas can be treated to lower its water content before burning the sulfur. Combined stream 56 containing a 2:1 molar ratio of H$_2$S to SO$_2$ is sent to a Claus catalytic absorption reactor 32 operating at a low temperature. Desired inlet temperature of stream 56 can be reached through manipulating streams 45 and 54, or stream 56. Product sulfur 33 is removed from the catalyst as above and purified tail gas 34 is treated and discharged to the atmosphere.

Apparatus of the invention includes a conversion means for converting substantially all sulfur compounds in a sulfur containing gaseous stream to a single sulfur species, thereby producing a single sulfur species stream. A water reduction means in flow communication with the conversion means is provided. The water reduction means receives the single sulfur species stream and reduces water content in that stream to produce a dried single sulfur species stream.

A mixing means in flow communication with the water reduction means receives the dried single sulfur species stream. The mixing means uses at least a portion of the dried stream and produces a 2:1 H$_2$S to SO$_2$ gaseous mixture stream.

A Claus reactor means is also provided which is in flow communication with the mixing means and receives the temperature adjusted gaseous reaction mixture stream. The Claus reactor means catalytically reacts the gaseous reaction mixture stream to produce sulfur and water.

As described above, a bypass means can be provided to permit tail gas treatment in the event of process upset (See, for example, line 150 and valves 151 and 152 in FIG. 4 and discussion below). The bypass means is in flow communication with the sulfur containing gaseous stream and the Claus reactor means. In the event of process upset, the bypass means directs the sulfur containing gaseous stream to the Claus reactor means.

Figure 4:
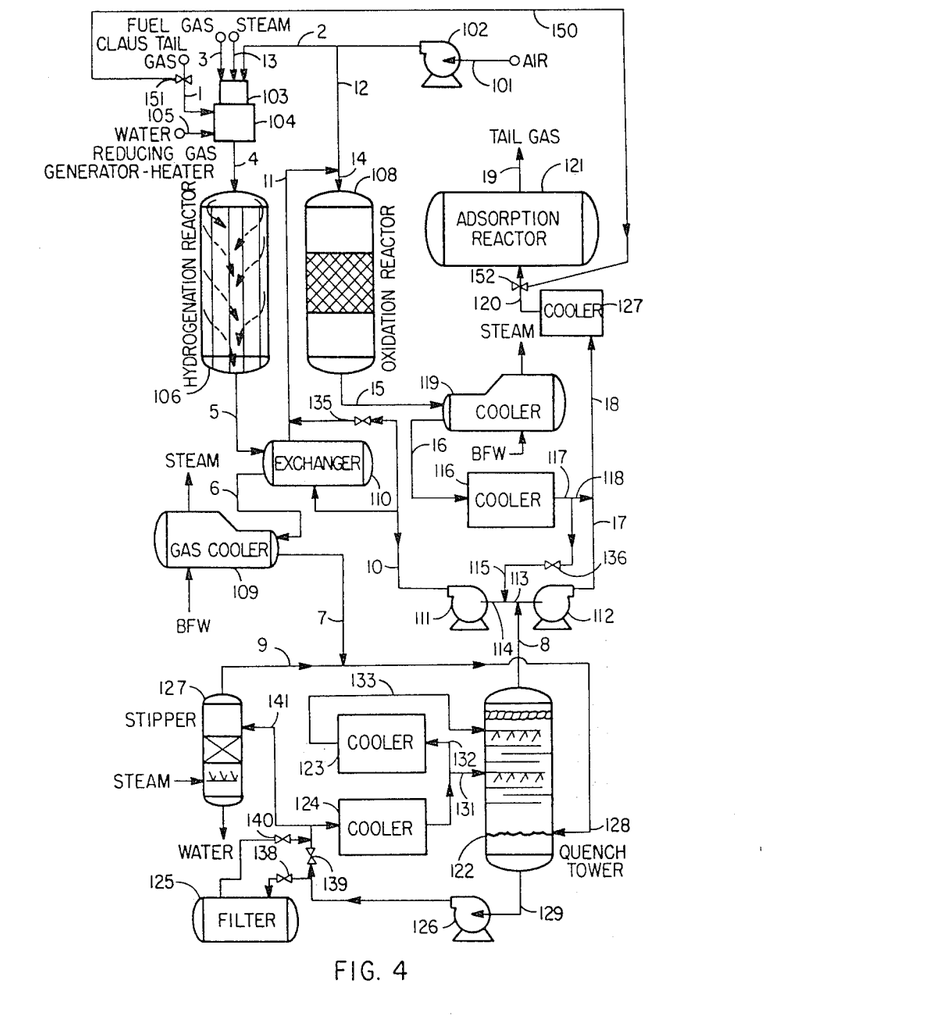
FIG. 4 illustrates a detailed process flow sheet illustrated generally in FIG. 1.

FIG. 4 is a detailed process flow sheet of the process illustrated generally in FIG. 1 employed as a Claus tail gas treatment method. Sulfur-containing Claus tail gas 1 is shown as feed to reducing gas generator-heater 104. Inputs to combustion zone 103 of heater 104 are air 101 sent via blower 102 in stream 2, steam 13, and fuel gas 3. Steam 13 may be fed to moderate the combustion temperature and to generate reducing gases by reaction with fuel gas. The combustion process in zone 103 furnishes hot gas to heater mixing section 104 to increase the temperature of the Claus tail gas feed 1 to a temperature range sufficient to undergo a later reduction reaction broadly about 450°–650° F., preferably about 580 to about 620° F., to achieve preferred operating temperatures in the hydrogenation reactor. Water 105, if desired, may be fed into mixing section 104 to control the temperature and to insure formation of a reaction mixture necessary for a subsequent reduction step.

Resulting heated stream 4 is fed into hydrogenation reactor 106. In the hydrogenation reactor the sulfur components of the hot gas are reduced by catalytic conversion to a single sulfur species, H$_2$S. The hot gas passes through a bed of a suitable catalyst which is preferably cobalt molybdenum on alumina, such as C29-2 manufactured by United Catalysts Inc. This catalyst promotes reduction and hydrolysis reactions which convert substantially all sulfur species present to hydrogen sulfide. The reactions occurring inside the hydrogenation reactor include the hydrolysis of both carbonyl sulfide and carbon disulfide to H$_2$S, and the conversion of SO$_2$ to hydrogen sulfide. The hydrogenation reactions are preferably performed at a temperature which yields maximum hydrolysis and reduction of carbonyl sulfide or carbon disulfide present. For example, in laboratory tests, an exit temperature of about 544° F. (450° F. inlet temperature) will reduce carbonyl sulfide to 38 ppm in exit gas stream 5.

Exit gas 5 from the hydrogenation reactor is sent to heat exchanger 110 to be cooled while heating the process gas feed 10 to oxidation reactor 108. The H$_2$S stream 6 exits the heat exchanger after being cooled to approximately 450° F. and is directed to gas cooler 109. Cooled stream 6 is further cooled to approximately 300°–350° F. by heat exchange for example, with boiler feed water, to generate steam. Resulting H$_2$S-laden stream 7 is sent to water quench tower 122. In the quench tower, the gas is further cooled by direct contact with water to condense water from stream 128. The water flows downward over trays inside the quench tower, countercurrent to the upward flowing gas 128. The gas passes through an entrainment separator in the top of the tower and exits as stream 8 at a temperature of about 40°–120° F. and preferably, about 40°–90° F., to reduce water content to a desired level. Lower temperatures reduce water content in stream 8 to lower levels. As a result of cooling to condense water in the quench tower, the resulting stream 8 contains less than about 15% and preferably less than about 10% or even 5%, water vapor by volume.

An alternate embodiment further cools the process stream before its introduction into the quench tower. Stream 7 is cooled, for example, by using a butane heat pump (not shown) to about 110°–180° F., to, for example, convert extracted heat into mechanical energy for process uses such as running an air blower. Some water condensation may also occur during this cooling. Cooling of stream 7 to the above range permits reduction in cooling requirements for the circulating water stream 129 before stream 129 can be reinjected into the quench tower.

Effluent water 129 is pumped by pump 126 from base of tower 122 through valve 139 into cooler 124. This reduces the water temperature to about 120° F. Approximately two-thirds of water stream 131 is reinjected at an intermediate point into quench tower 122. Remaining one-third 132 of the cooling water 129 passes through a second cooler 123 wherein its temperature is reduced to about 40°–120° F. and is injected as stream 133 above the top tray of tower 122.

A fraction 141 of the circulating water stream 129 equivalent to the water condensed in the quench tower is withdrawn continuously and sent to sour water stripper 127. Here, stripping steam is injected in the base of the stripping tower to remove gaseous compounds from the cooling water. Sour water stripper overhead gas is returned to quench tower 122 as stream 9 to be combined with $H_2S$ stream 7 as stream 128. The stripped water from bottom of tower 127 may then be reused for cooling water makeup, boiler feed water, or other process uses. On the water stream 129 from the base of the quench tower 122, a filter 125 is provided with access valves 138 and 140 to allow removal of small amounts of solid sulfur which may form during process upsets.

Cooled $H_2S$-rich stream 8 exits the water quench tower at a temperature of about 40°–120° F., preferably 40°–90° F., and is next manipulated by splitting into two-thirds and one-third fractions in order to eventually create a required 2:1 molar ratio reaction mixture of $H_2S/SO_2$ for a final Claus conversion. One-third fraction 113 (approximately 35% of the total) is compressed by blower 111 and sent as stream 10 to heat exchanger 110 where it is heated to produce a temperature of about 550°–700° F., preferably 550°–600° F., in stream 14 to prevent excessive temperatures during the oxidation reaction. If desired, part of stream 10 is routed through valve 135, bypassing the heat exchanger, to further control inlet temperature of feed stream 11 to an oxidation step to follow. Heated stream 11 then exits the exchanger and is routed towards oxidation reactor 108.

A stoichiometric amount of air 12 is mixed with stream 11 upstream of the oxidation reactor. Resulting air-$H_2S$ stream 14 is fed into the top of oxidation reactor 108. It is preferred that temperature of stream 14 be about 550°–600° F. to limit temperature in exit stream 15 to below 850° as discussed in greater detail below. The stoichiometric amount of air referred to is an amount just sufficient to oxidize one-third of all $H_2S$ present in stream 8 to $SO_2$ in the oxidation step to follow. The stoichiometric amount of air is thus such that the molar ratio of $O_2$ contained in the air to $\frac{1}{3}$ the amount of $H_2S$ in stream 8 is 1.5:1.

It is preferable that formation of $SO_3$ be minimized in the oxidation reactor to prevent deactivation or poisoning of the Claus catalyst in reactor 121. To do this requires avoiding the presence of excess oxygen which can be done, for example, by reducing amount of air to slightly below the required stoichiometric amount, or preferably feeding a slight excess of $H_2S$ into the oxidation reactor. In one embodiment, the excess $H_2S$ comes from directing approximately 35%, instead of $\frac{1}{3}$, of $H_2S$ stream 8 to the oxidation reactor.

To further control temperature in the oxidation reactor, stream 8 may be split into two portions of different fractions than the about $\frac{1}{3}$ and $\frac{2}{3}$ portions described above. Stream 10 may be a fraction in the range of about $\frac{1}{3}$ to about $\frac{1}{2}$ of stream 8. When using a larger portion in stream 10, the amount of stoichiometric air 12 sent to the oxidation reactor is maintained at an amount just sufficient to oxidize $\frac{1}{3}$ of the hydrogen sulfide of stream 8. The excess gas of a larger portion limits temperature rise from the oxidation because of dilution.

The oxidation reactor 108 contains an oxidation promoting catalyst. The preferred catalyst is conventional Claus activated alumina, such as Kaiser S-201. Another suitable catalyst is CR type made by Rhone-Poulenc. We have found that these catalysts promote the oxidation of $H_2S$ to $SO_2$ without undesired side reactions.

Stream 15 exits at a temperature of about 750°–1050° F. The exact temperature rise after the oxidation depends on mole percent $H_2S$ in stream 14, and is about 225° F. for each mole percent of $H_2S$ oxidized. The exit temperature must be held below about 1050° F. to prevent harm to the oxidation catalyst. It is therefore preferable to maintain exit temperature below about 850° F. to give an operating margin below 1050° F. in stream 15.

Resulting $SO_2$-laden stream 15 is cooled to about 330° F. in cooler 119. Cooled stream 16 then enters cooler 116, is cooled to a temperature sufficient to achieve desired inlet temperature of stream 18 and exits as stream 117. It can then be sent as stream 118 to be blended with main portion 17 of the process stream.

In order to limit the temperature of the effluent 15 from the oxidation reactor 108, it may be necessary to dilute feed stream 11 to the oxidation reactor. This is done by recycling effluent 15, after cooling, as stream 115 through control valve 136 to combine with stream 113, the combination of which after heating is feed stream 114 to the oxidation reactor. After heating, stream 114 is sent to the oxidation reactor 108 as stream 11. The amount of recycle required is controlled by valve 136.

The 2:1 molar ratio gaseous reaction mixture of $H_2S/SO_2$ is achieved by the combination of stream 118 with stream 17. Stream 17 is the about two-thirds fraction of stream 8 which is routed via blower 112. To achieve highest recovery, the molar ratio of $H_2S$ to $SO_2$ should be held close to 2:1 and within the range of about 1.9 to about 2.1.

Recombined stream 18 is sent through exchanger 127 as stream 120 to catalytic adsorption reactor 121. Exchanger 127 is provided to adjust the input stream 120 temperature.

The full stream then enters the bottom of low temperature Claus reactor 121, without introduction of an oxygen containing gas, at a temperature of about 160°–260° F., but preferably at a minimum temperature to yield high recovery. The low temperature Claus reactor contains a standard Claus catalyst such as Kaiser S-201 alumina.

As the low temperature conversion occurs, product sulfur will adsorb on the catalyst. Moreover, at a temperature of about 220° F., water formed as a result of the conversion of $H_2S$ and $SO_2$ will begin to be adsorbed significantly on the catalyst of the low temperature Claus reactor. This adsorption of water tends to reduce the catalytic activity as noted previously.

Exit tail gas 19 from the low temperature reactor 121 is at a temperature range of from approximately 220° to 260° F., depending on the exact inlet temperature as the Claus conversion is exothermic. The exit gas 19 is then burned to convert all remaining sulfur compounds to sulfur dioxide before discharge to the atmosphere.

It should also be noted that as the low temperature conversion proceeds, produced sulfur (and below 220° F., water) will begin to build up on the catalyst. This buildup will eventually result in a loss of catalyst activity, necessitating a regeneration of the catalyst. Such a regeneration can be performed, for example, by switching the feed stream to a second low temperature reactor for the final Claus conversion, and regenerating the first reactor's catalyst by sweeping a hot regeneration gas stream through the first reactor. The hot gas will remove adsorbed sulfur and can be a stream indigenous to the entire Claus process. After the catalyst is regenerated, the reactor must be cooled. This regeneration and cooling procedure is further described in U.S. Pat. No. 3,702,884, discussed above, which is hereby incorporated by reference.

Figure 5:
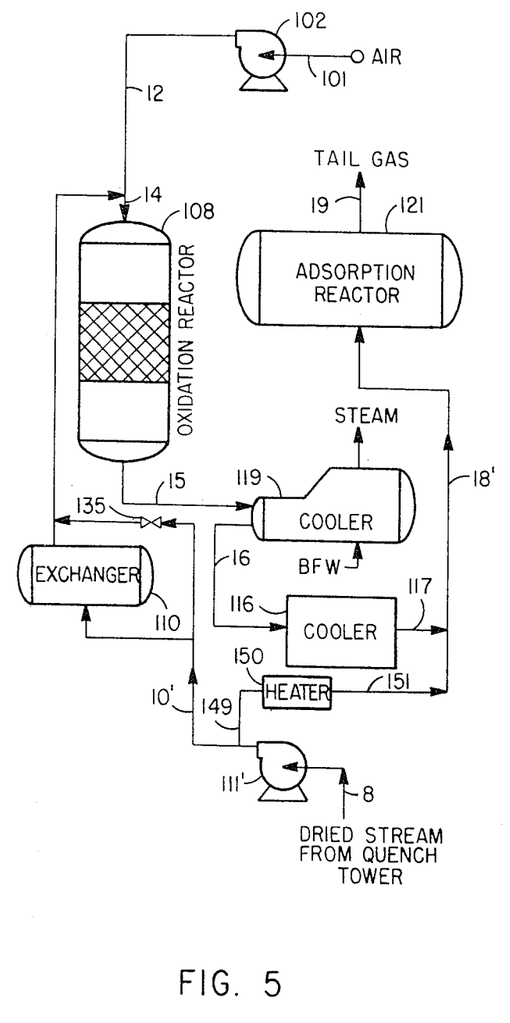
FIG. 5 shows a detail of a technique for temperature adjustment of a feed stream to a low temperature Claus reactor.

FIG. 5 shows a detail of a temperature adjustment technique for the feed stream into the low temperature Claus reactor. Dried $H_2S$ stream 8 from the quench tower is sent to blower 111'. After the blower the stream is split into one/thirds (about 35%) portion 10' and two/thirds portion 149. Stream 10' is routed through exchanger 110 to oxidation reactor 108 where all sulfur compounds in stream 10' are converted to $SO_2$. The procedure for oxidizing stream 10' is same as that described above for stream 10 in FIG. 4, wherein air 101 is sent by blower 102 through line 12 to mix with stream 10' before introduction as stream 14 into reactor 108. Exit stream 15 is cooled in two steps, first in cooler 119 and next as stream 16 in cooler 116, so that exit stream 117' has a temperature of about 250°–280° F., preferably 250°–260° F., to achieve desired temperature in stream 18'.

Two/thirds portion 149 containing $H_2S$ is routed to heater 150. Exit stream 151 has a temperature of about 180°–250° F. The exact temperature to which stream 151 is heated to is a temperature sufficient upon combination with stream 117' to achieve desired feed stream 18' temperature. This method of cooling the $SO_2$ stream and heating the $H_2S$ stream before combining is preferred for temperature adjustment of feed stream 18' to the final reactor 121 because it minimizes sulfur plugging problems and allows better energy balance for the overall process. $SO_2$ stream 15 before cooling may contain some sulfur formed during the oxidation step. Cooling stream 15 to about 250°–260° F., which is slightly above the sulfur solidification temperature, removes as much liquid sulfur as possible. Thus, when cooled stream 117 is mixed with stream 151 to reach an inlet temperature below the sulfur freezing point, only a small amount of sulfur, if any, may solidify.

Figure 7:
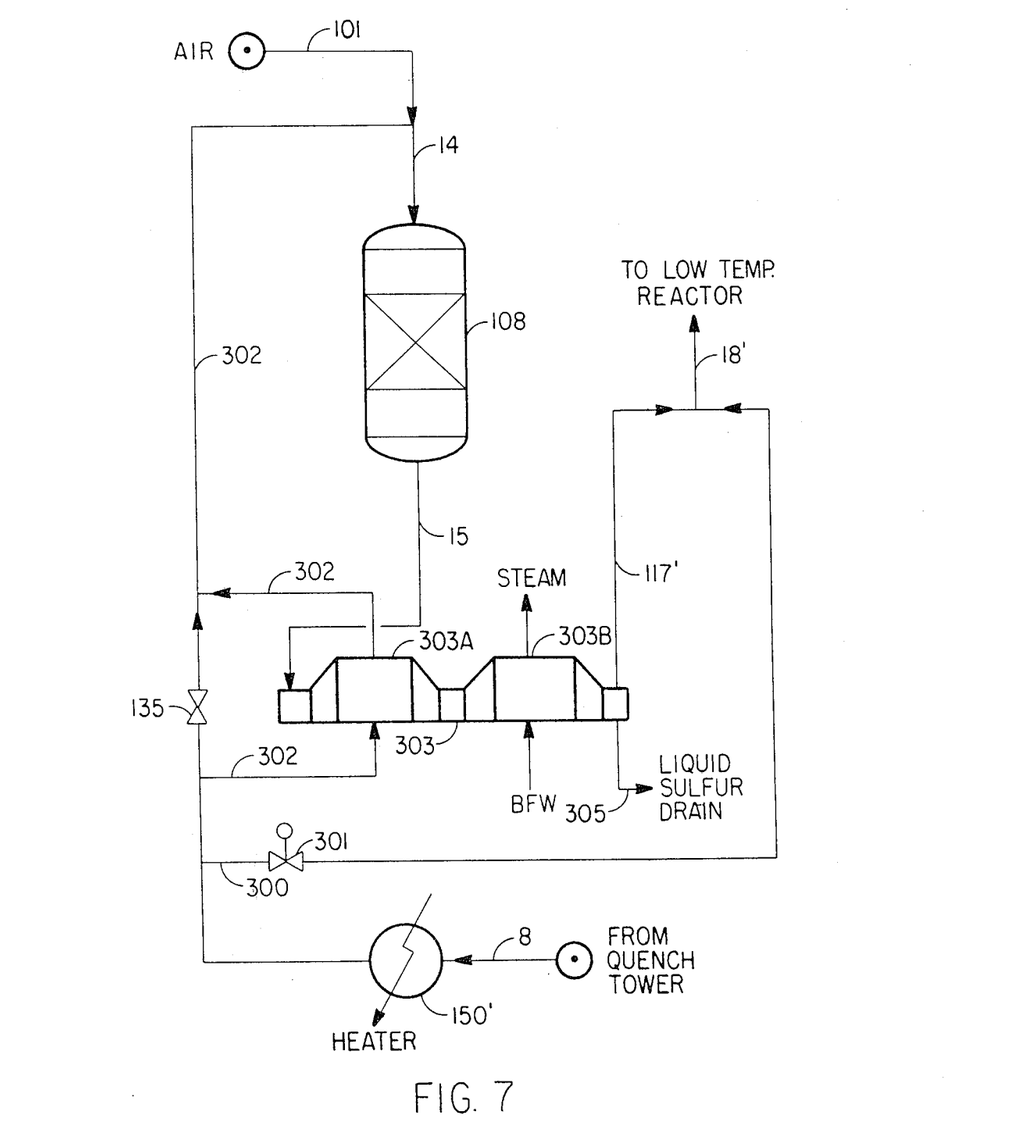
FIG. 7 illustrates an alternative embodiment for temperature adjustment of the feed stream to the low temperature Claus reactor.

It is also possible to heat stream 8 to a temperature of about 180 deg. F. to about 250 deg. F. before splitting stream 8 into ⅔ and ⅓ portions. This technique is illustrated in FIG. 7. There, stream 8 from the quench tower enters heater 150' and is heated to a temperature of about 180° to about 250° F. The stream is then split into about ⅓ portion 302 and about ⅔ portion 300. Stream 300 is routed through valve 301 towards the low temperature reactor. Stream 302 is thus partially heated and enters exchanger compartment 303A where it is heated to the desired temperature for the oxidation reaction described above. Stream 302 is heated by exchange with effluent 15 from oxidation reactor 108. A recycle through valve 135 is provided to limit temperature rise in the oxidation reactor as described above.

Stream 302 combines with a stoichiometric amount of air 101 to form stream 14. Substantially all sulfur compounds in stream 14 are oxidized to $SO_2$ in the oxidation reactor. $SO_2$-laden stream 15 exits the oxidation reactor and passes through a two-stage exchanger 303. In compartment 303A, stream 15 is cooled by heat exchange with stream 302. Stream 15 is further cooled in compartment 303B by heat exchange with water to generate steam. Any liquid sulfur formed during cooling is removed through drain 305. Stream 117' then exits exchange 303 at a temperature of about 250° to about 280° F., and preferably about 250° to about 260 deg. F. Stream 117' is combined with stream 300 to form stream 18' to establish the desired 2/1 molar ratio of $H_2S/SO_2$ in stream 18'. Stream 18' is sent to the low temperature reactor 121 having exit stream 19 for the Claus conversion.

Other alternatives for temperature adjustment exist. It is possible to mix uncooled stream 15 directly with unheated stream 149 and then cool or heat, if necessary, to desired temperature. However, no intermediate sulfur removal has occurred and plugging problems may be encountered. The energy balance of the process using a direct mix of stream 15 with unheated stream 149 is also more difficult. The same problems occur when unheated stream 17 is mixed with a slightly cooled stream 117'. The method depicted in FIG. 5 of cooling stream 15 and heating stream 151 separately is preferred to minimize or avoid sulfur condensation and to allow better energy balance of the process.

A further advantage to the use of the process when used as a Claus tail gas treating method is the ability to continue treatment despite process upsets in the low temperature process in producing a low temperature, low water content gaseous reaction mixture. A bypass line 150 and valves 151 and 152 can be provided which will direct Claus tail gas 1 (in FIG. 4) directly to the low temperature reactor. The only changes in the process are upon detection of an upset, for example failure of blower 111, bypassing all parts of the process except the catalytic conversion to sulfur and water and performing the Claus conversion at higher temperatures, i.e., the reactor's temperature must be raised above the low temperatures employed in the instant invention. The higher temperatures are preferably about 250°–300° F. Characteristically, tail gas streams from the final condensor of conventional Claus units have temperatures within this range. In using this technique, the feed stream is thus not subjected to reduction in water content, but recoveries are still maintained at a high level, for example, 99%, without shutting down the plant. This contrasts with the absorbent scrubbers which must shut down or vent Claus tail gas to the atmosphere if a process upset occurs.

Another operating feature that can be employed in the regeneration of the low temperature Claus reactor is to maintain the low temperature reactor at a slightly higher pressure than the regeneration gas stream. This allows use of less expensive switching valves which are subject to leakage. This leakage across the switching valves of regeneration gas which contains higher concentrations of sulfur compounds into the final reactor effluent increases plant emissions. Thus, operation at a slightly higher pressure eliminates this leakage without using more expensive valves. The slightly higher pressure actually need only be equal to or greater than that of the regeneration gas.

Although in the illustrated embodiment of FIG. 4 the process is utilized as a Claus tail gas treating process, the process can also be used to treat a low $H_2S$ content gas directly without prior conventional Claus treatment of the gas. A gas stream with an $H_2S$ content of about 0.25 to about 5% $H_2S$, and peferably about 0.5% to about 2.5%, about what Claus tail gas contains, can be treated in this manner. The upper limit on $H_2S$ content which is feasible for treatment without prior conventional Claus treatment is dependent upon how fast the catalyst in reactor 121 requires regeneration. Higher $H_2S$ contents require shorter adsorption cycles and rapid heating and cooling during the regeneration of the reactor can damage the reactor and/or catalyst. Higher $H_2S$ contents can also result in excessive temperature rise in the reactor which is also damaging.

For a process design depicted in FIG. 4, it was calculated on a theoretical basis for a typical feed stream that overall recovery for the plant (Claus plus low temperature reactor) would be 99.7%. The calculations also employed a conservative bias so actual recovery may be higher.

Comparison of the process flow diagram in FIG. 2 to the flow sheet in FIG. 1 (also shown in more detail in FIG. 4) discloses that both contain a catalytic oxidation step wherein sulfur compounds are oxidized to $SO_2$. However, the oxidations, though performed over the same catalysts, alumina are carried out with a change in amounts of oxygen-containing gas, such as air, fed into the catalytic oxidation reactor. In the process in FIG. 2, substantially all sulfur compounds present must be oxidized to $SO_2$ as any $H_2S$ left unconverted may cause an undesired Claus reaction during the subsequent water removal step. This total oxidation requires an excess of oxygen. Excess oxygen, however, must be avoided for the oxidation performed in FIG. 1. This is because excess oxygen can deactivate a Claus catalyst by sulfation of the catalyst, and the exit stream from the oxidation reactor in FIG. 1 goes directly to the low temperature Claus adsorption reactor. To ensure that excess oxygen is not present after the oxidation step in the process of FIG. 1, a slight excess of $H_2S$, about 35% instead of the 33% necessary to achieve Claus stoichiometry, is thus sent to the oxidation reactor in FIG. 1.

It is further preferrable that in the oxidation step in the process of FIG. 2 a second stage of an oxygen-scavenger catalyst, such as platinum-alumina, be provided in the oxidation reactor. The oxygen-scavenger catalyst promotes reaction of the excess oxygen with hydrogen and carbon monoxide that are present in the Claus gas; hydrogen is always present, and carbon monoxide usually is present in the Claus gas. This will permit excess oxygen for the oxidation but minimize the possibility of catalyst deactivation in the Claus conversion later in the process. In a preferred arrangement, the oxygen-scavenger catalyst will have a depth of one-fourth of the overall catalyst depth in the oxidation reactor.

EXAMPLE I

Equilibrium calculations of percent conversion to sulfur at varying feed stream temperatures from 280°–160° F. were performed for a feed gas stream to a process illustrated in FIG. 4 containing (in mole %) 1% $H_2S$, 0.5% $SO_2$, 30% $H_2O$, and the remainder, $N_2$. Further calculations maintained the amounts of $H_2S$ and $SO_2$ constant and reduced the water concentration to 10 and 0%, respectively. The calculations showed that percent conversion increased with decreased temperature and decreased water concentration. At 160° F. and 10% water content, the percent conversion of the low temperature reactor was 99.554%. This would give an overall plant recovery of 99.97%. These theoretical equilibrium calculations were then compared with laboratory bench scale tests.

The bench scale tests were performed on a feed stream composed of about 1.0% $H_2S$, 0.5% $SO_2$, 30%, 10%, and 0% $H_2O$, as indicated in Table 1, and the remainder $N_2$. The feed stream in all runs was sent to a laboratory size reactor containing Kaiser S-201 alumina. The reactor was 2 inches in diameter, 27 inches long, and contained a catalyst depth of 18 inches. The percent conversion to sulfur of the low temperature reactor was determined by subtracting $H_2S$ and $SO_2$ measured in the effluent gas with a gas chromatograph and also subtracting the calculated sulfur vapor loss at the effluent temperature. Runs were made at 280°, 260°, 240°, 220°, and 200° F. with 30% water; 260°, 220°, and 180° F. with 10% water; and 260° F. with 0% water in the feed stream. The results are shown in Table 1.

TABLE 1

| | Low Temperature Claus Conversion | | | | | | | | |
|---|---|---|---|---|---|---|---|---|---|
| | 30% Water | | | 10% Water | | | 0% Water | | |
| Temp. °F. | $H_2S$ + $SO_2$ | S Vap. | Rec. S | $H_2S$ + $SO_2$ | S Vap. | Rec. S | $H_2S$ + $SO_2$ | S Vap. | Rec. S |
| 280 | 6.0 | 2.6 | 91.4 | — | — | — | — | — | — |
| 260 | 7.4 | 1.3 | 91.3 | 3.6 | 1.3 | 95.1 | 1.0 | 1.3 | 97.7 |
| 240 | 6.3 | 0.6 | 93.1 | — | — | — | — | — | — |
| 220 | 8.1 | 0.3 | 91.6 | 4.0 | 0.3 | 95.7 | — | — | — |
| 200 | 9.2 | 0.3 | 90.5 | — | — | — | — | — | — |
| 180 | — | — | — | 4.4 | 0.2 | 95.4 | — | — | — |

The laboratory results show that percent recovery is improved with decreasing water concentration in the feed stream. The data also show that recovery is apparently somewhat improved with decreasing temperature at low water concentrations such as 10% water.

The slight increase in the percent unconverted $H_2S$ and $SO_2$ in the effluent stream at 220° and 180° F. was not predicted by the equilibrium calculations, however. This increase is attributed to an analytical error in the measurement of concentrations or an indication of the kinetic effect of lower temperature. The present interpretation of the laboratory data and equilibrium calculation data is that percent conversion to sulfur and water increases as feed conditions are shifted downward and to the right in Table 1, i.e. towards lower temperatures and towards lower water concentrations.

EXAMPLE II

Figure 6:
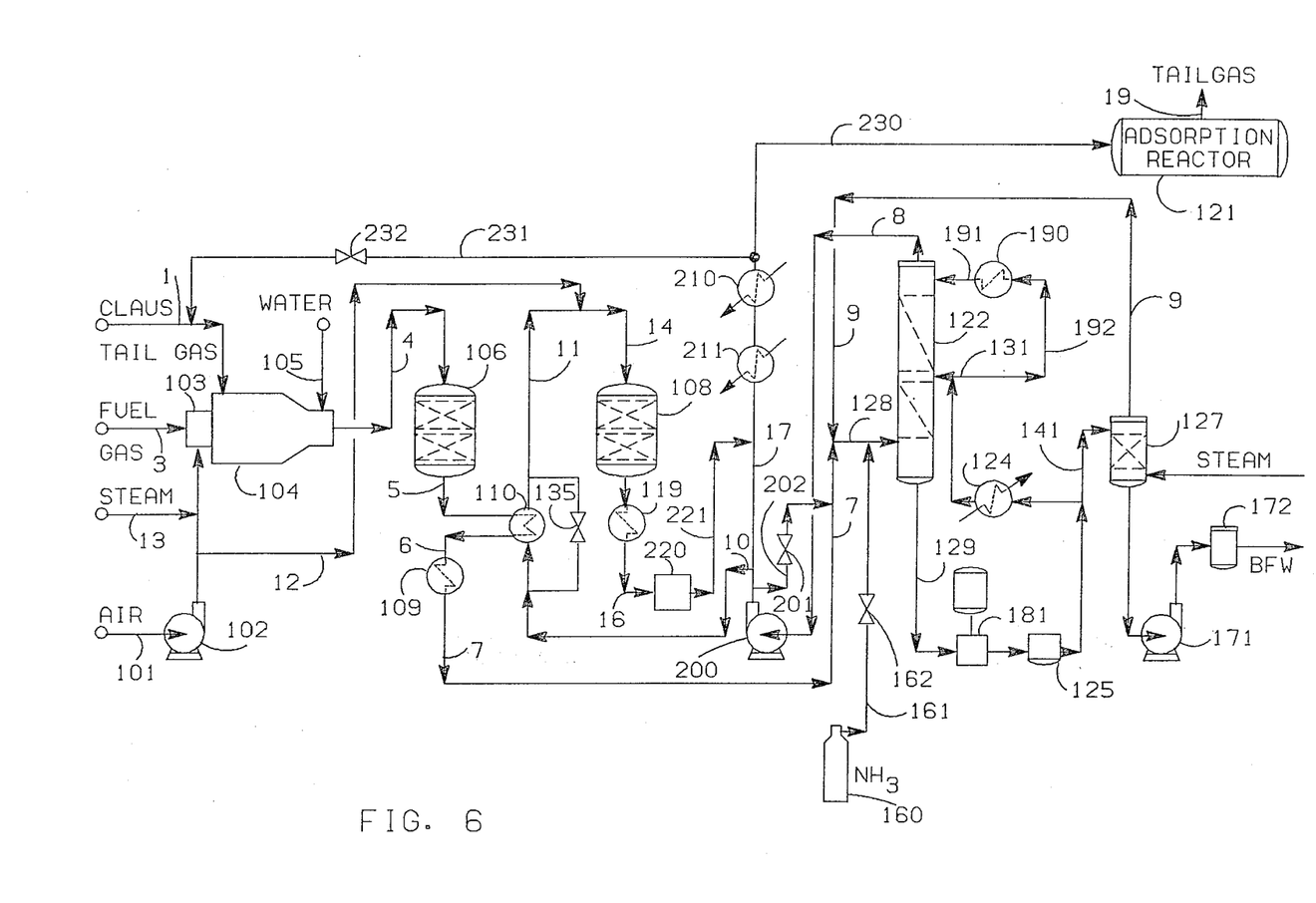
FIG. 6 shows a flow sheet for a pilot plant for testing of the invention.

FIG. 6 shows a flow sheet of a pilot unit designed and constructed based primarily on the process flow scheme illustrated in FIG. 4.

Claus tailgas 1 enters reducing gas generator heater 104. Fuel gas 3, steam 13, and air 101 routed through blower 102 are shown entering into the combustion zone 103 of the heater. Water 105 is fed into the reducing gas generator for cooling if necessary. Reducing gas mixture stream 4 enters hydrogenation reactor 106 at a design temperature of about 638° F. wherein substantially all sulfur compounds are reduced to $H_2S$. The catalyst employed in the hydrogenation reactor is United Catalyst Inc. C29-2 with ⅛ inch particle size, which is extruded cobalt-molybdenum on a aluminum base.

$H_2S$-laden stream 5 exits and is cooled in cooler 110 to about 410°–450° F. in stream 6 and in cooler 109 to about 320°–330° F. Cooling in cooler 110 is performed by heat exchange with feed stream 11 to the oxidation reactor 108. Cooling in cooler 109 is by generating steam.

Stream 7 is fed as stream 128 into the quench tower 122. Provision is made to maintain the pH of feed stream 128 to the quench tower at about 7.0, neutral pH, when excessive amounts of $SO_2$ are present to lessen corrosion. This is done by adding ammonia 160 through line 161 and control valve 162 where necessary. The ammonia is not added during normal operations. In the quench tower, water content is reduced by cooling and condensing water by contacting the upward flowing $H_2S$-laden stream with a cooling water stream 129. Stream 129 is continuously recycled after cooling to maintain desired quench tower temperature. Recycling of stream 129 is done with pump 181 through filter 125 for removal of any solids present. A slipstream 41 of stream 29 which is equal to amount of water condensed in the quench tower as determined by a level monitor in the quench tower is withdrawn. The slipstream is sent to sour water stripper 127 wherein it is contacted with steam to remove sulfur compounds from the slipstream. Overhead stream 9 contains sulfur compounds removed and is returned to stream 128 for introduction back into the quench tower. Water is withdrawn from the stripper and is sent by pump 171 through filter 172 for reuse or disposal.

Remainder of stream 129 is sent to cooler 124 where it is cooled from about 160° F. to about 120° F. About 70% of 120° F. water 131 is reinjected into an intermediate part of the quench tower. Remaining 30% in stream 192 is further cooled in refrigerated cooler 190 and as stream 191 is returned to the top of the quench tower at a temperature of about 40°–90° F.

Stream 8 exits the quench tower at a temperature of about 80° F. with reduced water content and is sent to blower 200. The stream is then split into two-thirds portion 17 and one-third portion 10 which is routed to oxidation reactor 108. Stream 10 is first heated in heater 110 to about 500° F. To control temperature rise in the oxidation reactor, a recycle through valve 135 is provided. Stream 11 is combined with a stoichiometric amount of air 12 as stream 14 and enters the oxidation reactor 108. The oxidation reactor 108 is 48 inches inside diameter X 7 ft. 9¼ total height. It contains 2 catalyst beds, each 2 ft. thick. Both beds are packed with Kaiser S-201 catalyst. In the oxidation reactor, all sulfur compounds in stream 14 are converted to $SO_2$.

Stream 16 exits the oxidation reactor at about 750° F. and is cooled in cooler 119 to about 330° F. Stream 16 then passes through cooler 220 and exits at a temperature about 150° F. A filter (not shown) is provided to remove any sulfur formed. $SO_2$ stream 221 then recombines with two-thirds portion 17.

The molar ratio of $H_2S$ to $SO_2$ is controlled by measuring $H_2S$ and $SO_2$ concentration in stream 17. Air 101 input to the oxidation reactor is adjusted in accordance with the measurements to control amounts of $SO_2$ formed in the oxidation reactor. For example, where the molar ratio is greater than 2:1, the amount of air is increased to increase formation of $SO_2$.

A recycle line (not shown) off stream 221 is provided, through it was not used during testing. The recycle line is accessed through a valve and is provided with a blower. The recycle is located after cooler 220 and returns stream 221 to blower 200.

A recycle is provided to maintain positive pressure on the suction of blower 200. This is a recycle of stream 8 through valve 201 as stream 202. Stream 202 is recycled to the quench tower through stream 7.

Line 231 through shut-off valve 232 is provided to assist in warm-up of the plant during startup operations. Stream 230 is recirculated back to the reducing gas generator 104 during warmup.

Recombined stream 17 at a temperature about 145° F. is routed to heater 211 wherein temperature is adjusted to desired feed temperature for the low temperature Claus reactor 121. Cooler 210 is also provided in the event cooling temperature adjustment of inlet temperature is necessary because of excessive temperature in the effluent stream 221 from the oxidation reactor. Stream 230 is routed adsorption reactor 121 wherein catalytic conversion of $H_2S$ and $SO_2$ to sulfur and water occurs. Purified tail gas 19 is then discharged to the atmosphere.

The pilot plant unit is added to an existing two reactor Claus sulfur recovery unit with an acid gas feed stream of 64 mol/hr (a capacity of 22 long tons per day), and the apparatus of the pilot is sized to process the full tail gas stream from the Claus unit. The primary sulfur component concentrations in the Claus tail gas stream which the pilot design is based upon are 2.18 mol/hr of hydrogen sulfide and 1.09 mol/hr of sulfur dioxide.

The process depicted in FIG. 6 is operated continuously for an 800-hour period with the exception of approximately 65 hours downtime due to process upsets. The amount of sulfur dioxide in the incinerated tail gas 19 is measured. Tables 2 and 3 provide information on six runs. A run is a period of time in which stable operation is obtained and for which measurements of sulfur dioxide in the incinerated tail gas are available. The runs employed a 16 hour adsorption and a 16 hour regeneration cycle for the low temperature Claus reactors.

TABLE 2

| Run No. | 6 | 8 | 9 | 11 | 14 | 15 |
|---|---|---|---|---|---|---|
| Q.T. temp. (°F.) | 80 | 80 | 81 | 50 | 52 | 50 |
| React. temp. (°F.) | 278 | 242 | 260 | 243 | 238 | 272 |

Table 2 depicts operating conditions of the six runs. Shown is the quench tower temperature, i.e., the temperature at which stream 8 exits the quench tower, and the low temperature reactor temperature. Temperatures in the low temperature reactor range from 278° F. to 238° F. Quench tower temperature ranges from 80° F. to 50° F.

TABLE 3

EFFICIENCIES BASED ON MEASURED INCINERATOR SULFUR DIOXIDE

| Run | Measured Incin. $SO^2$ (ppm) | Measured Efficiency (%) |
|---|---|---|
| 6 | 452 | 99.82 |
| 8 | 285 | 99.87 |
| 9 | 228 | 99.90 |
| 11 | 333 | 99.86 |
| 14 | 452 | 99.80 |
| 15 | 2400 | 99.11 |

Table 3 depicts efficiencies as calculated based on the measured $SO_2$ for the separate runs. the efficiencies are overall Claus plus pilot plant sulfur recovery. The results show that a commercial embodiment according to the invention can achieve high recovery efficiencies.

It is not intended that the invention described herein be limited to the descriptions presented. Various changes can be made in the methods and apparatus depicted without departing from the principles of the invention. The scope of the invention is given by the appended claims.

We claim:

1. A method of treating an effluent tail gas stream from a final reactor in a Claus plant, the stream comprising a mixture of water and sulfur-containing compounds including hydrogen sulfide and sulfur dioxide, the method comprising:
    (a) converting substantially all sulfur containing compounds of the tail gas stream to sulfur dioxide;
    (b) reducing water content of the thus produced stream to produce a dried stream;
    (c) creating a 2:1 molar ratio gaseous reaction mixture of hydrogen sulfide to sulfur dioxide in the dried stream; and (d) catalytically converting the gaseous reaction mixture in the thus produced stream to water and sulfur by additional Claus conversion under low temperature and low water vapor conditions, the temperature being such that sulfur deposits on the catalyst.

2. A method of treating an effluent tail gas stream from a final reactor in a Claus plant, the stream comprising a mixture of water and sulfur-containing compounds including hydrogen sulfide and sulfur dioxide, the method comprising:
   (a) converting substantially all sulfur-containing compounds of the effluent tail gas stream to sulfur dioxide;
   (b) cooling the thus produced stream to below 247° F. and reducing the water content thereof to produce a cooled dried stream;
   (c) creating a 2:1 molar ratio gaseous reaction mixture of hydrogen sulfide to sulfur dioxide in the cooled dried stream; and
   (d) catalytically converting the gaseous reaction mixture of hydrogen sulfide and sulfur dioxide to water and sulfur by additional Claus conversion under low temperature and low water vapor conditions, the temperature being below about 260° F.

3. Process as in claim 1 wherein the temperature is in a range of 160°–260° F.

4. Apparatus for treating an effluent tail gas stream from a final reactor in a Claus plant, the effluent tail gas stream comprising a mixture of water and sulfur-containing compounds including hydrogen sulfide and sulfur dioxide, the apparatus comprising:
   (a) catalytic oxidation means for receiving the effluent tail gas stream and for converting substantially all compounds in said effluent tail gas stream to sulfur dioxide;
   (b) cooling and water reduction means in flow communication with said catalytic oxidation means for receiving the thus-produced sulfur dioxide stream and for cooling to a temperature below 247° F. and for reducing water content in said sulfur dioxide stream to produce a cooled dried sulfur dioxide stream;
   (c) mixing means in flow communication with said cooling and water reduction means for receiving the cooled dried sulfur dioxide stream and for producing a 2:1 molar ratio $H_2S:SO_2$ gaseous reaction mixture stream; and
   (d) Claus reactor means in flow communtication with said mixing means for receiving said gaseous reaction mixture stream and for catalytically reacting hydrogen sulfide and sulfur dioxide at a temperature such that sulfur adsorbs on the catalyst.

* * * * *